June 28, 1932.  H. F. FISHER  1,864,723
TREATER USING HIGH TENSION REACTANCE
Filed June 22, 1931

INVENTOR:
Harmon F. Fisher,
BY
ATTORNEY.

Patented June 28, 1932

1,864,723

UNITED STATES PATENT OFFICE

HARMON F. FISHER, OF LONG BEACH, CALIFORNIA, ASSIGNOR TO PETROLEUM RECTIFYING COMPANY OF CALIFORNIA, OF LOS ANGELES, CALIFORNIA, A CORPORATION OF CALIFORNIA

TREATER USING HIGH TENSION REACTANCE

Application filed June 22, 1931. Serial No. 546,005.

My invention relates to a novel method of dehydrating petroleum emulsion, and to improved apparatus for carrying out such a method.

In my co-pending application Serial No. 132,375, filed August 30, 1926, I have disclosed one form of apparatus whereby the voltage impressed across the electrodes of a dehydrator may be periodically peaked, resulting in a very desirable treating action. The present application is directed to such a method of dehydration, as well as to an improved apparatus whereby a superior treating action may be accomplished, and is a continuation-in-part of my application Serial No. 134,476, filed September 9, 1926.

In the commercial production of oil from wells, either by pumping or flowing, it has been found that the oil is contaminated with water. The water and oil exist in an emulsified state, the water being in the form of minute droplets suspended in the oil-phase, these droplets being too minute in size to gravitate from the oil even after prolonged standing.

One method at present in wide use for separating the phases of such an emulsion is to subject the emulsion to the action of a high intensity electric field of alternating polarity. This alternating polarity as usually applied is generated by apparatus giving a so-called sine-wave electromotive force. It has been found that the dispersed water droplets agglomerate under the influence of such a field and form masses of sufficient size to gravitate from the oil when the constituents are allowed to stand. There is, however, a tendency for the agglomerated water masses to line up across the electrodes between which the electric field is established, and thus cause an excessive current to flow. This current is often quite heavy and apparently has little effect in accomplishing the desirable agglomeration. In fact, it has a very undesirable effect inasmuch as it decreases the potential applied across the electrodes, thus making it difficult to maintain a sufficient potential to accomplish the agglomeration.

One of the important objects of this invention is to break such chains as may have formed, and to prevent in a measure the formation of other chains, and I have found that this can be accomplished, and a very desirable treating action obtained, if the potential between the electrodes at or near the peak of the normal frequency applied voltage is momentarily built up to several times the normal effective potential between the electrodes. This sudden increase in potential apparently sets up a disrupting action tending to break any low-resistance chains of water which have already formed and the rapid decrease in the momentarily applied potential tends to further prevent formation of additional chains. The exact theory underlying this desirable action is not completely understood, but with certain types of emulsions and particularly with those quite "wet" emulsions having a large water content, the action has been found to be very desirable.

It is an object of this invention to provide an electric dehydrator and method in which an extremely highly peaked potential is periodically superimposed upon the ordinary so-called sine-wave potential normally impressed across the electrodes.

A further object of the invention is to provide a method of treating emulsion by passing the emulsion between electrodes maintained at different potentials, and changing the wave form of the electromotive force impressed on these electrodes at such time when the normally applied potential between these electrodes is decreased due to heavy current consumption; in other words, when the current between the electrodes increases.

In certain instances it has been found that at intervals during the treating of an emulsion quite a large current is drawn, but that thereafter there will be a rapid decrease in current flow until the current drops to an almost imperceptible value. This will be followed by another quite heavy flow of current. In my invention a highly peaked potential of extremely short duration is impressed on the electrode at the instant the current drawn by the emulsion between the electrodes is relatively large, this being contrary to former theories wherein attempts were sometimes made to decrease the potential when the current increased. By momentarily increasing the potential, and especially if the increased potential is of steep wave front, a very desirable action tending to break any high-conductivity chains takes place. In addition, by storing electric energy in a condenser or other storage means and releasing this available energy at the time the high-conductivity chains form, the surge effect is greatly increased and a very desirable action obtained.

In accomplishing these results I have found it desirable to interpose a voltage-reducing means such as a choke coil or resistance in series with the circuit supplying energy to the electrodes, and to provide a shunting means for periodically short-circuiting the voltage-reducing means, thus momentarily increasing the potential across the electrodes by an amount equal to the voltage drop previously present across the voltage-reducing means. In my application Serial No. 217,680, filed September 6, 1927, I have shown and claimed a synchronously driven means for periodically short-circuiting such a voltage-reducing means. The present invention has for one of its objects the broader provision of any means for thus short-circuiting the voltage-reducing means at intervals, and also the provision of a means for automatically short-circuiting the voltage-reducing means only when the current flowing between the electrodes is high.

By using a non-inductive voltage-reducing means it is possible to impress the peak voltage directly on the peak of the low-frequency alternating potential supply. By substituting an inductance or capacitance for such a resistance, or by changing the impedance of such a voltage-reducing means, it is possible to impress this peak potential on the low-frequency alternating potential at different points, thus changing the phase relationship of the peak voltage and the low-frequency alternating potential utilized.

It is an object of this invention to provide a system wherein such a shifting of the phase can be effected.

While most petroleum emulsions can be successfully broken by an electric field established by the use of alternating potentials of commercial frequency, such as 25, 50 or 60 cycles, it has been found that certain types of emulsions can only be broken effectively by the use of high-frequency potentials. In addition, the action of a high-frequency potential has been found to be very desirable from the standpoint of breaking any low-resistance chains which have formed between the electrodes, the steep wave fronts and surges of such a high-frequency potential having a very desirable action in breaking these chains. One important effect of the surges is to supply a relatively large amount of electric energy to the emulsion when the high-conductivity chains tend to form, this surge somehow acting to disrupt the chains, due probably to the momentary surge of energy which was previously stored in the condensers.

It is an object of this invention to successively subject the emulsion to the action of high and low-frequency electric fields. Such a combination results in a new co-action in view of the fact that the low-frequency apparently effects a large part of the agglomeration, and the high-frequency breaks any low-resistance chains which tend to short-circuit the electrodes and reduce the potential therebetween to a value too low to be effective. In addition, it is possible to have two distinct types of emulsion present in the mixture undergoing treatment, one type being best treated by a low-frequency field, and the other by a high-frequency field. With this type of mixture the successive application of high and low-frequency fields produces a much cleaner separation than can be effected by the individual use of either a high or low-frequency field.

A further object of the invention is to subject the emulsion to a momentary surge at the time when the current in the field builds up, thus applying a high-frequency field only when the effect thereof will be most pronounced.

It is a further object of the invention to combine the shunting means previously mentioned with an oscillatory circuit for effecting this combined high-frequency and low-frequency treatment.

Further objects and advantages of the invention will be made evident hereinafter.

The invention may be best understood by reference to the diagrammatic drawing, in which—

Figure 4:
Figure 5:

Figs. 4 and 5 similarly illustrate the wave form when the capacitance and inductance are relatively large in the voltage-reducing means.

Figure 1:
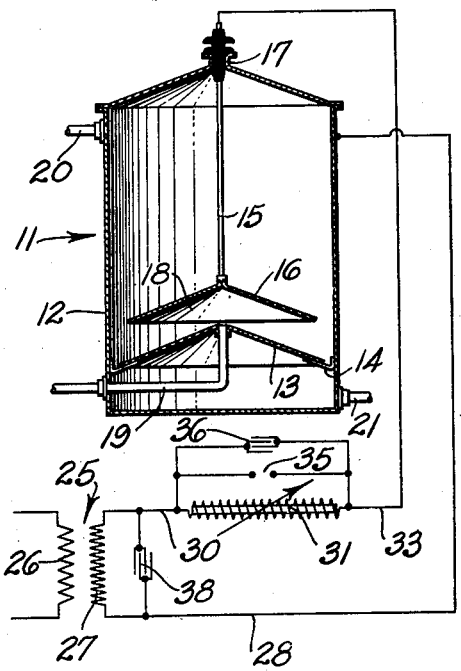
Fig. 1 is a diagrammatic view of one form of the invention utilizing an inductance as a voltage-reducing means.

Referring particularly to Fig. 1, the numeral 11 represents one form of dehydrator provided with a tight shell 12. Supported inside this shell and in electrical contact therewith is a ground electrode 13 spaced from, but secured to, the shell by straps 14. Hung onto a support 15 and above the ground electrode 13 is a live electrode 16, the support 15 extending through an inlet bushing 17 whereby it is insulated from the shell 12. The emulsion to be treated is introduced into a treating space 18 formed between the electrodes 13 and 16 through a pipe 19 communicating therewith. Separation of the constituents of the emulsion takes place in the shell 12, the oil being withdrawn through a pipe 20 and the water being withdrawn through a pipe 21 in the usual manner.

A difference of potential is maintained between the electrodes 13 and 16 by the use of a potential supply means 25 which is shown as being in the form of a step-up transformer having a primary winding 26 connected to a suitable source of alternating current, and a high potential secondary winding 27. One terminal of the secondary winding 27 is connected to the shell 12, and to ground, through a conductor 28. The other terminal of the secondary is connected by means of a conductor 30 to one terminal of a potential-reducing means 31, the other terminal thereof being connected to the live electrode through a conductor 33. In Fig. 1, the potential-reducing means has been shown in the form of a reactance coil which can, if desired, be made variable, as indicated. The normal current which reaches the electrodes must thus pass through the voltage-reducing means, with the result that a voltage drop takes place thereacross. Shunted around the potential-reducing means 31 is a shunting means shown to be in the form of a spark gap 35 of the usual form, and preferably one which permits adjustment of the space between the electrodes defining the gap. It may be preferable in some cases to also shunt the voltage-reducing means with a condenser 36, usually of very limited capacity, and it has been found to be usually preferable, however not in all cases necessary, to connect a storage means across the secondary winding 27 of the transformer, this being indicated by a condenser 38.

Figure 2:
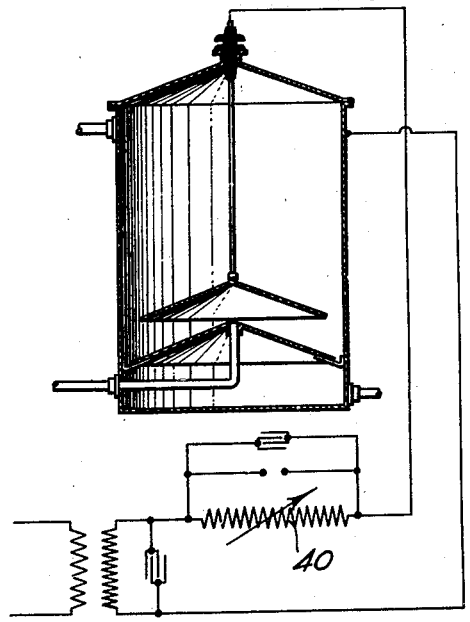
Fig. 2 is an alternative form utilizing a pure resistance.

In Fig. 2, I have shown a similar system differing only in that the voltage-reducing means is in the form of a resistance 40 rather than a reactance. This resistance 40 may be of a fixed or variable character and serves the same general purpose as the reactance shown in Fig. 1.

The operation of my invention is substantially as follows:

Assuming that the transformer has been suitably energized and that the treater has been in operation for some time, it is at once apparent that the voltage between the electrodes 13 and 16 is not equal to the voltage across the secondary winding 27, being less than this voltage by an amount equal to the voltage drop across the voltage-reducing means 31. As agglomeration takes place in the electric field between the electrodes 13 and 16, there is a tendency for low-resistance paths or chains to be formed across the electrodes which increase the current flow. This increased current increases the voltage drop across the voltage-reducing means 31 so that the voltage between the electrodes 13 and 16 is reduced. In other words, the output voltage of the secondary winding 27 is divided between the voltage-reducing means and the electrodes 13 and 16. As this current through the field increases the voltage drop across the voltage-reducing means correspondingly increases until the air or other dielectric between the electrodes of the spark gap breaks down and an arc is formed across the gap. This arc is, of course, of low resistance and short-circuits the voltage-reducing means and thus momentarily increases the voltage between the electrodes 13 and 16 to a high value. This peak potential is applied for only a small fraction of a second, for the arc in the spark gap is almost immediately broken. During the existence of this arc, however, the condenser 38, if used, discharges the energy previously stored therein and assists in this momentary surge of potential to the electrodes 13 and 16. The condenser 36, as well as the condenser 38, acts during the existence of this arc to form an oscillatory circuit whereby the momentary potential surge may be of a high-frequency character, if desired. Thus, impressed on a low-frequency alternating potential is a peak potential which may, if desired, be of a high-frequency character in view of the oscillatory nature of the circuits involved. By proper design of the condensers, it is possible to change the high-frequency characteristic of the surge.

Figure 3:
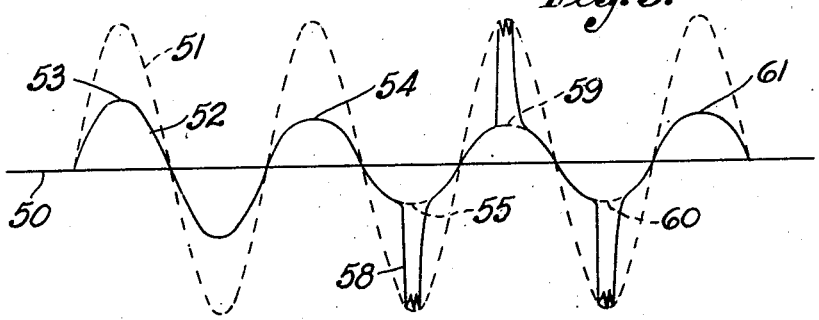
Fig. 3 is a diagrammatic representation of wave form impressed on the electrodes when a resistance is used for the voltage-reducing means.

This action may be graphically illustrated in a diagrammatic manner, as shown in Fig. 3, wherein is plotted on an abscissa axis 50 a sine curve indicated by dotted lines 51 and which represents the voltage across the terminals of the secondary winding 27. Shown as being directly in phase with this potential (and which is the case when the voltage-reducing means and the dehydrator are both non-inductive or when both have identical phase angles) is the potential impressed across the electrodes 13 and 16 and represented by the full line 52. The first crest 53 of this curve is somewhat lower than the crest of the secondary voltage indicated by the dotted lines 51, the difference being the potential drop across the voltage-reducing means. At a succeeding instant, the crest of the curve 52, as indicated by the numeral 54, is of less magnitude, thereby indicating that the potential between the electrodes 13 and 16 is decreasing due to the increased current flowing therebetween. On the following voltage crest, indicated by the numeral 55, the voltage between the electrodes would be still lower, but at this time the potential across the voltage-reducing means has become so great that the spark gap 35 breaks down, thus allowing the potential to increase to a value many times higher than the peak voltage 55 that would otherwise be built up on this crest. This surge is indicated by the numeral 58 and has a very steep wave front, and is preferably of an oscillatory character, as diagrammatically illustrated in Fig. 3. This surge lasts only momentarily, and as soon as the condensers are discharged this potential either drops as indicated in Fig. 3, or drops when the curve 52 passes through the zero point. I have illustrated the two succeeding crests 59 and 60 as also being peaked. After the latter crest the short-circuiting chains are sufficiently disrupted so that the voltage across the electrodes 13 and 16 again builds up to a value indicated by the numeral 61, this value being too high to allow short-circuiting of the voltage-reducing means by the spark gap 35. Thus, at intervals, and whenever the resistance of the emulsion in the treating space becomes sufficiently low, the low-resistance chains are broken by peaking the voltage applied to the electrodes in such a manner as to disrupt these chains. Once disrupted, the voltage across the electrodes again builds up to the desired value and the spark gap does not again come into use until the current in the field increases at a subsequent time.

The reason for this desirable action is not definitely understood, but it has been definitely established that the momentary peaking of the voltage does tend to break the short-circuiting chains, and that an oscillatory discharge during such peaking of the voltage has an additional desirable effect along the lines, especially with certain types of emulsions. It is probable, however, that the momentary surge, especially when this surge has a steep wave front, establishes a localized difference in potential across any low-resistance paths in such a manner as to increase the stress on the water particles forming these low-resistance paths and thereby effecting a disruptive action.

When a non-inductive resistance is utilized for the voltage-reducing means, the crests will be impressed substantially in phase with the crest on the low-frequency potential indicated by the numeral 52, as shown in Fig. 3. If, as has usually been found to be preferable, a reactance coil is utilized for the potential-reducing means, the peak potential will be impressed slightly out of phase with the crests of the potential indicated by the curve 52. As shown in Fig. 5, the peak voltage in this case leads the crests of the potential indicated by the numeral 52 similarly, it is sometimes possible to utilize a condenser for the voltage-reducing means, or to use an impedance having an inductance which is less than its capacitance. In this case, the peak potential will also be out of phase with the crests of the potential indicated by the numeral 52 in Fig. 2, the peaks in this case lagging behind the crests of the curve 52, as shown in Fig. 4. It is sometimes possible when using a condenser as the voltage-reducing means to dispense with the spark gap in the event that the condenser is provided with a self-healing dielectric in which case the condenser itself will short-circuit upon the building up of the potential thereacross to the desired value.

It should be understood that various modifications of the invention are possible and fall within the scope of this invention. Thus, in most instances it is possible to dispense with the condenser 36, and in some instances it is possible to dispense with the condenser 38. So also it should be understood that the graphical representations of Figs. 3, 4, and 5 are only diagrammatic and under actual working conditions the shape of the peaks will in some instances be different from that shown in these figures.

I claim as my invention:

1. A method of treating an emulsion which comprises: passing said emulsion into an electric field between a pair of electrodes, said field being formed by an electromotive force impressed between said electrodes; and changing the wave form of said electromotive force when the potential between said electrodes decreases.

2. A method of treating an emulsion which comprises: passing said emulsion into an electric field between a pair of electrodes, said field being formed by an electromotive force impressed between said electrodes; and peaking the wave form of said electromotive force as a function of the current flowing between said electrodes.

3. A method of treating a fluid which comprises: generating a primary potential; reducing said primary potential; impressing the reduced potential across a pair of electrodes; passing said fluid between said electrodes; and successively increasing said reduced potential to said primary potential.

4. A method of treating a fluid which comprises: generating a primary potential; utilizing said potential for setting up an electric field; passing said fluid through said electric field whereby current flows through said electric field to reduce the potential thereacross; and successively and intermittently raising said reduced potential to substantially the value of said primary potential, said rise in potential taking place as a function of the current drawn by said field.

5. A method of treating a petroleum emulsion, which includes the steps of: successively subjecting said emulsion to low-frequency and high-frequency electric fields whereby the dispersed phase of said emulsion is agglomerated; and separating said agglomerated phase from the remaining constituents of said emulsion.

6. A method of treating a petroleum emulsion by the use of a pair of electrodes, which method includes the steps of: applying to said electrodes a low-frequency alternating potential for a period of time; then applying to said electrodes a high-frequency potential whereby low-frequency and high-frequency fields are set up in quick succession between said electrodes; and subjecting the emulsion to the action of said electric fields.

7. A method of treating a petroleum emulsion by the use of a pair of electrodes, which method includes the steps of: applying to said electrodes a low-frequency alternating potential for a period of time; then applying to said electrodes a high-frequency potential of greater peak potential than said low-frequency alternating potential whereby low-frequency and high-frequency fields are set up in quick succession between said electrodes; and subjecting the emulsion to the action of said electric fields.

8. In an apparatus for dehydrating emulsion, the combination of: a pair of electrodes; a circuit including a source of potential and said electrodes; and potential changing means connected to said circuit for increasing the potential across said electrodes when the electrical resistance therebetween is reduced.

9. In an apparatus for dehydrating emulsion, the combination of: a pair of electrodes; a circuit including a source of potential and said electrodes; and means connected to said circuit for increasing the potential across said electrodes when the electrical resistance therebetween is reduced below a predetermined value.

10. In an apparatus for dehydrating an emulsion, the combination of: a pair of electrodes; a source of potential for energizing said electrodes to set up an electric field therebetween; a potential-reducing means in circuit with said source of potential and said electrodes and through which passes the current supplied to said electrodes by said source of potential; and shunting means for periodically shunting said potential-reducing means.

11. A combination as defined in claim 10 in which said voltage-reducing means is in the form of a resistance.

12. A combination as defined in claim 10 in which said voltage-reducing means is in the form of a reactance.

13. In an apparatus for dehydrating emulsion, the combination of: a pair of electrodes; an electricity supply means for supplying electricity to said electrodes; potential-reducing means for reducing the potential impressed on said electrodes; and shunting means for shunting said potential-reducing means when an excessive current is drawn by said electrodes.

14. In an apparatus for dehydrating emulsion, the combination of: a pair of electrodes; an electricity supply means for supplying electricity to said electrodes; potential-reducing means for reducing the potential impressed on said electrodes; and a spark gap for shunting said potential-reducing means.

15. In an apparatus for dehydrating emulsion, the combination of: a pair of electrodes; a current supply means for supplying electricity to said electrodes; potential-reducing means for reducing the potential impressed on said electrodes; shunting means for periodically shunting said potential-reducing means; and an electricity storage means connected to said current supply means.

16. In an apparatus for dehydrating an emulsion, the combination of: a pair of electrodes; a source of potential for energizing said electrodes to set up an electric field therebetween; a potential-reducing means in circuit with said source of potential and said electrodes and through which passes the current supplied to said electrodes by said source of potential; a spark gap shunted across said potential-reducing means and adapted to form a low-resistance path around said voltage-reducing means when an excessive current is drawn by said electrodes; and a condenser shunted across said potential-reducing means.

17. In an apparatus for dehydrating emulsion, the combination of: a pair of electrodes; a transformer, the secondary of said transformer being connected in a circuit with said electrodes; a storage condenser across said secondary; a spark gap in said circuit; and a by-pass condenser across said gap, said gap and said by-pass condenser in said circuit varying the normal wave form of aid transformer, the re-formed wave form being impressed on said electrodes.

18. In an apparatus for dehydrating emulsion, the combination of: a pair of electrodes; a transformer, the secondary of said transformer being connected in a circuit with said electrodes; a spark gap in said circuit; and a condenser across said gap, said gap and said condenser in said circuit varying the normal wave form of said transformer, the re-formed wave form being impressed on said electrodes.

19. In combination in an electric dehydrator: a primary electrode; a secondary electrode insulated from said primary electrode; a high potential secondary winding of a transformer providing a pair of terminals between which a high potential is impressed; means connecting one terminal of said secondary winding to one of said electrodes; and means for capacitatively connecting the other terminal of said secondary winding to the other of said electrodes so that if short-circuiting of said electrodes takes place the voltage across said last-named means increases.

20. In an apparatus for dehydrating emulsion, the combination of: a pair of electrodes; a circuit including a source of potential and said electrodes; and oscillatory means connected to said circuit for changing the wave form of the potential impressed across said electrodes when the electrical resistance between said electrodes is changed.

21. In an apparatus for treating an emulsion, the combination of: a pair of electrodes between which the emulsion is positioned; means for impressing a low-frequency alternating potential across said electrodes; and means operating as a function of the current flowing between said electrodes for impressing a high-frequency alternating potential across said electrodes for a short period of time when the current increases beyond a predetermined point.

22. In an apparatus for dehydrating a petroleum emulsion, the combination of: a pair of electrodes between which is positioned the emulsion to be treated; means for impressing a low-frequency alternating potential across said electrodes; and means for periodically impressing a high-frequency alternating potential across said electrodes for a period of time which is only a fraction of a half cycle of said low-frequency potential.

In testimony whereof, I have hereunto set my hand at Los Angeles, California, this 16th day of June, 1931.

HARMON F. FISHER.